United States Patent
Ives

(10) Patent No.: US 6,822,933 B2
(45) Date of Patent: Nov. 23, 2004

(54) HIGH DENSITY DATA STORAGE MODULE

(75) Inventor: Thomas W. Ives, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 183 days.

(21) Appl. No.: 10/109,093

(22) Filed: Mar. 28, 2002

(65) Prior Publication Data

US 2003/0185140 A1 Oct. 2, 2003

(51) Int. Cl.$^7$ .................................................. G11B 7/00
(52) U.S. Cl. ............................ 369/44.16; 369/44.14
(58) Field of Search .................... 369/258, 44.16, 369/44.14

(56) References Cited

U.S. PATENT DOCUMENTS 5,557,596 A    9/1996 Gibson et al.
5,615,143 A  * 3/1997 MacDonald et al. ........ 365/112
6,587,408 B1 * 7/2003 Jacobson et al. ......... 369/44.16

FOREIGN PATENT DOCUMENTS

EP           1174995 A2    1/2002

* cited by examiner

Primary Examiner—William Klimowicz
Assistant Examiner—Mark Blouin

(57) ABSTRACT

A data storage module for a data storage device has a rotor having a plurality of storage areas for data storage, the storage areas each being in one of a plurality of states to represent the data stored in that area. A first set of flexures suspends the rotor within a first frame and permits the rotor to move in a first direction. A first comb drive is connected to the rotor and the first frame for moving the rotor in the first direction. A second set of flexures suspends the first frame within a second frame and permits the first frame to move in a second direction normal to the first direction. A second comb drive is connected to the first frame and the second frame for moving the first frame in the second direction.

18 Claims, 4 Drawing Sheets

HIGH DENSITY DATA STORAGE MODULE

THE FIELD OF THE INVENTION

The present invention generally relates to data storage devices, and more particularly to a storage module for use with ultra-high density data storage devices.

BACKGROUND OF THE INVENTION

It is well recognized in the field of data storage that it is desirable to increase the storage density and reduce the cost of storage in information storage devices. This is generally true for all types of information storage devices, such as magnetic hard drives, optical drives, RAM devices, and other information storage devices. However, it becomes increasingly difficult to squeeze more information into the storage devices. Moreover, conventional technologies to make those storage devices may be approaching fundamental limits on storage density.

There are many proposed alternatives to increase the storage density of storage devices. Some examples are Scanned Probe Microscopy (SPM), Atomic Force Microscopy, Scanning Tunneling Microscopy (STM), Near-Field Scanning Optical Microscopy, and Scanning Force Microscopy. Each of these proposed alternatives has its own benefits and detriments. Some are extremely expensive to build; some are difficult to implement; others have limited or poor resolution and bandwidth; still others have poor signal-to-noise ratios.

Even if one is successful in increasing the storage density, another major hurdle must still be overcome. Specifically, the time required to access the stored information must be small. Simply put, a storage device's utility is limited if it takes too long to retrieve the stored information, no matter what it's storage density. In other words, in addition to high storage density, one must find a way to quickly access the information.

In U.S. Pat. No. 5,557,596 to Gibson et al., an ultra-high density storage device which provides increased storage density while having fast access times and high data rates is described and claimed. The ultra-density storage device of Gibson et al. is based on the use of field emitters, which are made by standard semiconductor fabrication technology, and which emit beams of electrons from very sharp points. In one embodiment of Gibson et al., the storage device includes many field emitters, a storage medium and a micro mover. The storage medium has many storage areas, and the field emitters are spaced apart to have one emitter responsible for a number of storage areas on the storage medium. In one embodiment, each storage area is responsible for one bit of data on the storage device. The medium is in close proximity to the field emitters, such as a few hundredths of a micrometer to a few micrometers away.

Each field emitter generates an electron beam current. Each storage area can be in one of a few different states. In one embodiment, binary information is stored in the areas, with one state representing a high bit and another state representing a low bit. When an electron beam current bombards a storage area, a signal current is generated. The magnitude of the signal currents depends on the state of that storage area. Thus, information stored in the area can be read by measuring the magnitude of the signal current. Information can be written onto the storage areas using the electron beams. The magnitude of each electron beam can be increased to a pre-selected level to change the states of the storage area on which it impinges. By changing the state of a storage area, information is written onto it.

Like the field emitters, the micro mover is made by semiconductor micro fabrication techniques. The micro mover scans the storage medium with respect to the field emitters or vice versa. Thus, each emitter can access information from a number of storage areas on the storage medium. With hundreds or thousands of field emitters reading and/or writing information in parallel, the storage device has very fast access times and data rates.

To assure that the storage medium is accurately written to and read as it is moved by the micro movers, it is desirable for the storage medium to have complete ease of motion in the plane of the storage medium, and to have no motion in the direction normal to the plane of the storage medium. That is, it is desirable to keep the distance between the field emitters and the storage medium as constant as possible.

Although it is desired that the storage medium move only in a single plane, achieving this result is difficult. For example, the micro mover is intended to move the storage medium solely in the plane of the storage medium (i.e., in the X-Y plane). However, depending upon the type of micro mover, there may be a tendency for the micro mover to move the storage medium out-of-plane (i.e., displace the storage medium in the Z direction). Also, environmental factors such as vibration may cause or contribute to out-of-plane movement. A storage module design that reduces out-of-plane movement of the storage medium is clearly desirable. At the same time, the space limitations of the storage device must be considered. That is, the storage module should occupy as little space as possible (and thereby increase the storage medium available for data storage) while also restricting or reducing inputs which contribute to out-of-plane motion.

SUMMARY OF THE INVENTION

A data storage module for a data storage device has a rotor having a plurality of storage areas for data storage, the storage areas each being in one of a plurality of states to represent the data stored in that area. A first set of flexures suspends the rotor within a first frame and permits the rotor to move in a first direction. A first comb drive is connected to the rotor and the first frame for moving the rotor in the first direction. A second set of flexures suspends the first frame within a second frame and permits the first frame to move in a second direction normal to the first direction. A second comb drive is connected to the first frame and the second frame for moving the first frame in the second direction.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
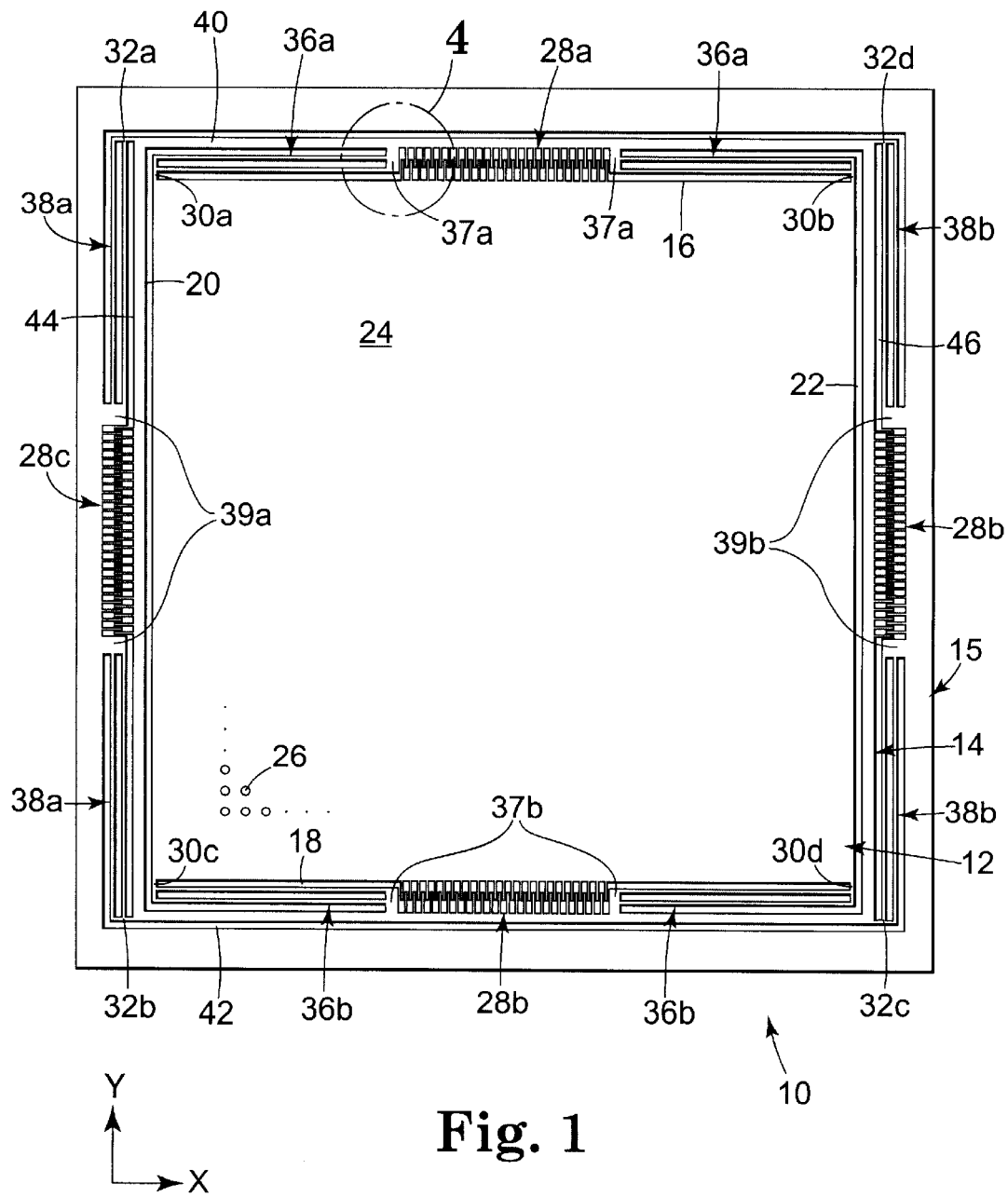
FIG. 1 is a top plan view of one embodiment of the invention having a single rotor.

One embodiment of a high-density storage module 10 is illustrated in FIG. 1. Storage module 10 includes a rotor 12, an inner frame 14 for supporting rotor 12, and an outer frame 15 for supporting inner frame 14. Rotor 12 is bounded by its top edge 16, bottom edge 18, left edge 20 and right edge 22. The front face 24 of rotor 12 defines an X-Y plane, with top edge 16 and bottom edge 18 aligned with the X-axis, and left edge 20 and right edge 22 aligned with the Y-axis. (As used herein, directional terms such as top, bottom, left, right, front and back are relative terms, and should not be construed as a limitation on the overall orientation of the storage module 10).

Front face 24 of rotor 12 includes a storage medium that has a plurality of storage areas 26 for data storage. The storage areas 26 (shown generically in FIG. 1) are in one of a plurality of states to represent data stored in that area. As discussed in greater detail below, rotor 12 is moved with respect to inner frame 14, and inner frame 14 is moved with respect to outer frame 15 by micro-movers or actuators 28a, 28b, 28c, 28d. In one embodiment of the invention, actuators 28a, 28b, 28c, 28d are electrostatic comb drives.

Rotor 12 is supported by inner frame 14, and inner frame 14 is supported by outer frame 15, by a plurality of support structures which interconnect rotor 12 to inner frame 14, and inner frame 14 to outer frame 15. Many MEMS devices use beams or flexures to support masses and their systems. The beams supply both support of the systems mass and compliance for the system's mass movements. It is often desirable to have the greatest in-plane to out-of-plane compliance ratio (referred to herein as the compliance ratio) possible. However, this ratio can be limited by the chosen mechanical architecture. The reason a high compliance ratio is desirable is that the micro mover or actuator forces provided by the actuator devices used in MEMS devices are not very strong. Thus, improving in-plane compliance while maintaining, or improving, the compliance ratio is desirable. Increasing the in-plane compliance may be accomplished by allowing for axial shortening of the beams or flexures. That is, as the beams flex they tend to become shorter in the axial direction which leads to a decrease in the in-plane compliance. Compensating for this axial shortening will increase the in-plane compliance. An additional way to improve the in-plane compliance while keeping the out-of-plane compliance low and still improving the compliance ratio is to allow the ends of the beams or flexures to move angularly. Even a small angle at either or both ends of the beam can significantly increase the in-plane compliance. In many instances, the same structure may compensate for axial shortening and also allow angular movement of the beam.

Figure 2A:
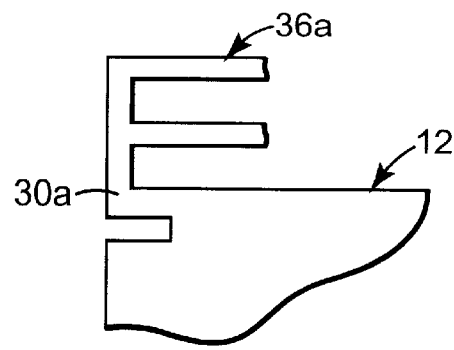
FIGS. 2a and 2b are illustrations of alternate embodiments of a portion of the invention.
Figure 2B:
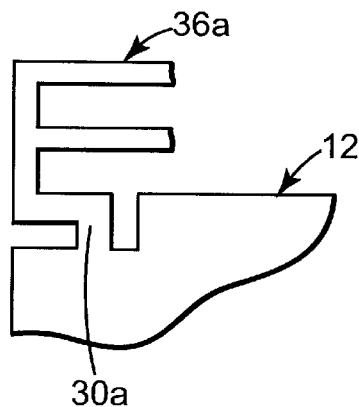

As shown in FIG. 1, to compensate for axial shortening and also allow angular movement of the supporting beams, a first set of coupling beams 30a, 30b, 30c, 30d extend from top edge 16 and bottom edge 18 of rotor 12. Coupling beams 30a, 30b, 30c, 30d may be oriented such that they are approximately normal to a first set of flexures 36a, 36b to maximize their ability to compensate for axial shortening and allow angular movement of flexures 36a, 36b. In one embodiment shown in FIG. 1, rotor 12 is rectangular in shape and coupling beams 30a, 30b, 30c, 30d extend from the corners of rotor 12. In the illustrated embodiment, coupling beams 30a, 30b, 30c, 30d are generally aligned with the left and right edges 20, 22 of rotor 12. However, coupling beams 30a, 30b, 30c, 30d may have a different origination and orientation from that shown in FIG. 1. For example, the alternate embodiments shown in FIGS. 2a and 2b allow coupling beam 30a additional freedom to rotate and thereby provide additional in-plane compliance to the rotor 12.

Rotor 12 is supported within the interior perimeter of inner frame 14 by first set of flexures 36a, 36b. Flexures 36a (positioned adjacent top edge 16 of rotor 12) extend between inner frame 14 and coupling beams 30a, 30b. Flexures 36b (positioned adjacent bottom edge 18 of rotor 12) extend between inner frame 14 and coupling beams 30c, 30d. In one embodiment, at their attachment point to inner frame 14, flexures 36a, 36b attach to flexure mounts 37a, 37b extending from inner frame 14. Flexure mounts 37a, 37b and inner frame 14 are essentially rigid structures as compared to flexures 36a, 36b. Alternatively, flexure mounts 37a, 37b could be flexible members similar to coupling beams 30a, 30b, 30c 30d. First set of flexures 36a, 36b, have an axial orientation which is generally aligned with the top and bottom edges 16, 18 of rotor 12, respectively, such that movement of rotor 12 with respect to inner frame 14 along the Y-axis is permitted.

Similar to coupling beams 30a, 30b, 30c, 30d extending from rotor 12, the exterior perimeter of inner frame 14 has a set of coupling beams 32a, 32b, 32c, 32d, to compensate for axial shortening and also allow angular movement of the supporting beams. Coupling beams 32a, 32b, 32c, 32d may be oriented such that they are approximately normal to a second of flexures 38a, 38b to maximize their ability to compensate for axial shortening and allow angular movement of flexures 38a, 38b. In one embodiment shown in FIG. 1, inner frame 14 is rectangular in shape and coupling beams 32a, 32b, 32c, 32d extend from the corners of inner frame 14. In the illustrated embodiment, coupling beams 32a, 32b, 32c, 32d are generally aligned with the top and bottom edges 40, 42 of inner frame 14. However, coupling beams 32a, 32b, 32c, 32d may have a different origination and orientation from that shown in FIG. 1, similar to those additional embodiments shown in FIGS. 2a and 2b with respect to coupling beams 30a, 30b, 30c, 30d.

Inner frame 14 is supported within the interior perimeter of outer frame 15 by second set of flexures 38a, 38b. Flexures 38a (positioned adjacent left edge 44 of inner frame 14) extend between outer frame 15 and coupling beams 32a, 32b. Flexures 38b (positioned adjacent right edge 46 of inner frame 14) extend between outer frame 15 and coupling beams 32c, 32d. In one embodiment, at their attachment point to outer frame 15, flexures 38a, 38b attach to flexure mounts 39a, 39b extending from outer frame 15. Flexure mounts 39a, 39b and outer frame 15 are essentially rigid structures as compared to flexures 38a, 38b. Alternatively, flexure mounts 39a, 39b could be flexible members similar to coupling beams 32a, 32b, 32c 32d. Second set of flexures 38a, 38b have an axial orientation which is generally aligned with the left and right edges 44, 46 of inner frame 14 (as well as left and right edges 20, 22 of rotor 12), such that movement of inner frame 14 (and accordingly rotor 12) with respect to outer frame 15 along the X-axis is permitted.

It should be noted that in the embodiment shown in FIG. 1 the sets of flexures 36a, 36b, 38a, 38b each comprise a total of four individual flexures. However, a different number of individual flexures may be used in the sets of flexures (for example, a total of two or six flexures in each set).

In one embodiment, coupling beams 30a, 30b, 30c. 30d, 32a, 32b, 32c, 32d, and flexures 36a, 36b, 38a, 38b are thin-walled micro-fabricated beams. The faces of flexures 36a, 36b are in the X-Z plane; this set of flexures may be flexed in the positive and/or negative Y-direction allowing the rotor 12 to move in the positive and/or negative Y-direction with respect to the inner frame 14. The faces of flexures 38a, 38b are in the Y-Z direction; this set of flexures may be flexed in the positive and/or negative X-direction allowing the inner frame 14 (and thus rotor 12) to move in the positive and/or negative X-direction with respect to the outer frame 15.

Figure 3:
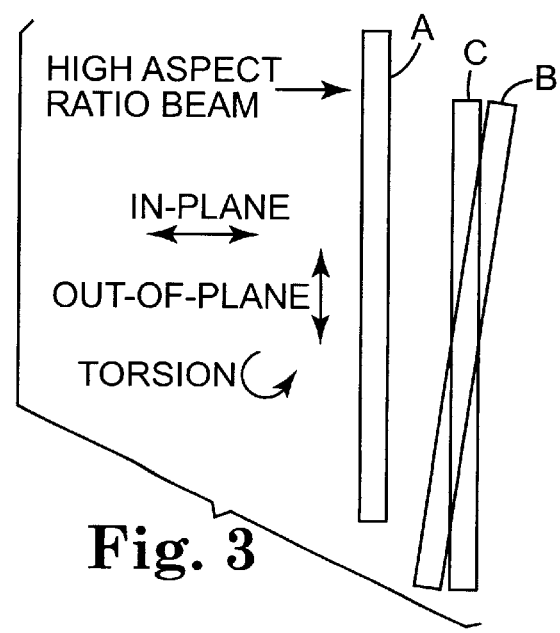
FIG. 3 is an axial view of a high aspect cantilever beam illustrating beam movement and torsion in one embodiment of the invention.

An axial view of a high aspect beam, like the flexures in one embodiment of the invention, is shown in FIG. 3. As the beams are flexed in-plane and out-of-plane, a torsion occurs in the beams. This torsion occurs even though the beam does not twist with respect to its axial plane. FIG. 3 shows cross-sections of a beam under no load (Position A), in-plane and out-of-plane loads (Position B), and in-plane, out-of-plane and torsion loads (Position C). Because the motion of rotor 12 or inner frame 14 puts the beam in torsion due to the moment arms arising from displacement, the beam's tendency is to flex back from the Position C illustrated in FIG. 3 toward the Position B illustrated in FIG. 3. As noted above, it is often desirable to have the greatest in-plane to out-of-plane compliance ratio possible. However, this compliance ratio is often decreased by the beam torsions described above. In order to maintain a higher compliance ratio, it is desirable to decrease the beam's torsional and out-of-plane compliance while maximizing its in-plane compliance.

In the invention described herein, the beam torsional and out-of-plane compliance is reduced by aligning the flexures in such a way as to effectively counteract the torsions created in the flexures as the rotor 12 is displaced along the Z-axis (that is, when rotor 12 is pulled up or down by the micro mover). The greatest counteraction effect is achieved when flexures 36a, 36b are oriented to axially point at the midpoint of flexures 38a, 38b. However, counteraction of the torsions are also achieved the lesser extent when the intersection is not at the midpoint of flexures 38a, 38b. Thus, the position of the first and second set of flexures 36a, 36b, is such that the axes of the first and second set of flexures 36a, 36b, intersect the flexures 38a, 38b somewhere along the length of flexures 38a, 38b.

Movement of rotor 12 and inner frame 14 is accomplished using actuators. In one embodiment, rotor 12 is moved along the Y-axis with respect to inner frame 14 by actuators 28a, 28b, and inner frame 14 is moved along the X-axis with respect to the outer frame by actuators 28c, 28d. In one embodiment, actuators 28a, 28b, 28c, 28d are electrostatic actuators positioned in the plane of rotor 12. One type of electrostatic actuator is an electrostatic comb drive, which is essentially a parallel plate capacitor. Electrostatic comb drives are generally known in the art and consist of many interdigitated fingers (with each side of the drive resembling a comb). When a voltage is applied across the combs an attractive force is developed between the fingers, causing them to move together. The attractive force between the combs can be computed as the change in stored energy U with distance (x). The energy stored is given by the equation $U=CV^2/2$, where C is the capacitance and V is the voltage across the combs. Thus, the force can be computed by the equation $F_x=V^2 \delta C/\delta x/2$. The capacitance is proportional to the number of interdigitated fingers, so to generate large forces, large numbers of fingers are required.

Figure 4:
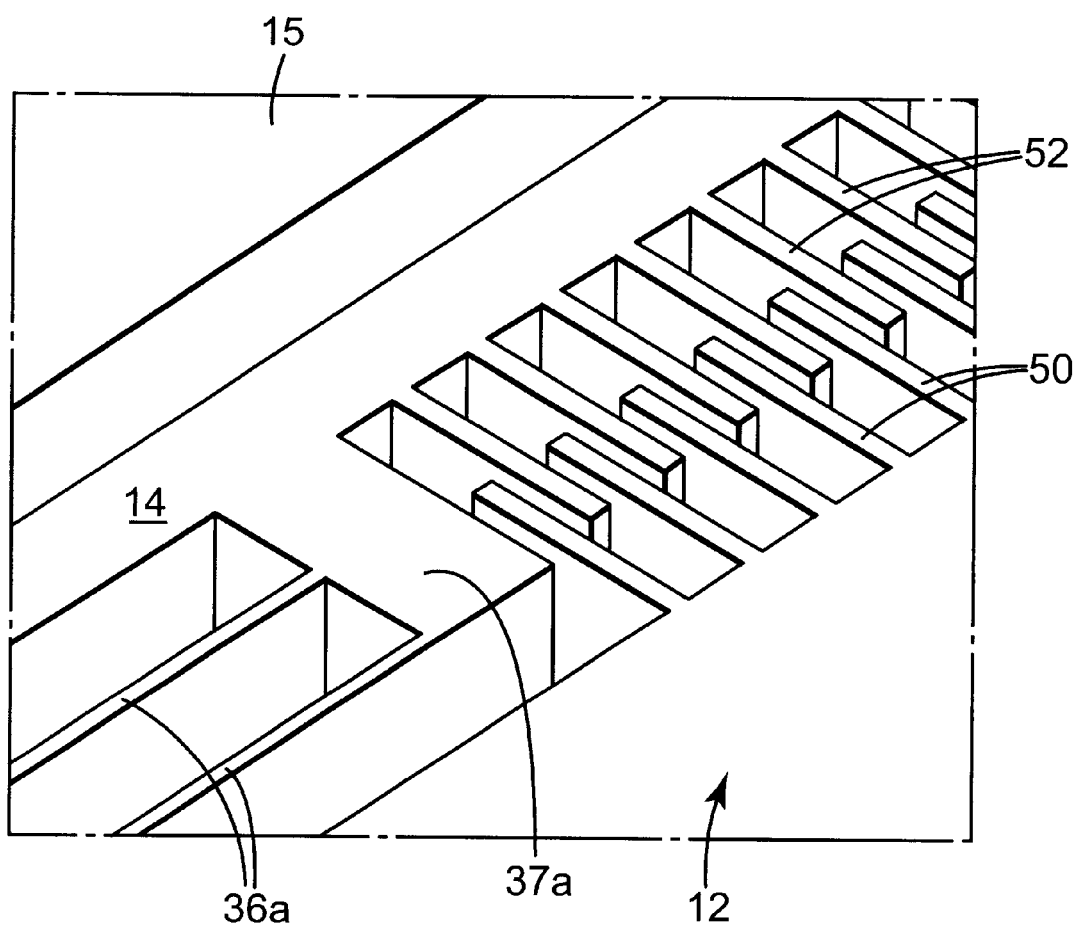
FIG. 4 is a greatly enlarged perspective view of a portion of the embodiment of the invention shown in FIG. 1.

As shown in FIG. 1, to move rotor 12 with respect to inner frame 14, one comb 50 of an actuator 28a is attached to rotor 12, while a mating comb 52 is attached to inner frame 14. Circled portion 4 of FIG. 1 is shown greatly enlarged in FIG. 4. As described above, when a voltage is applied across the combs 50, 52 a force is developed between the fingers, causing the combs 50, 52 to move together. As combs 50, 52 of actuator 28a move together, rotor 12 is moved in the positive direction along the Y-axis. Only attractive forces can be generated by a comb drive actuator. Thus, if it is desired to move rotor 12 in the negative direction along the Y-axis, a second comb drive 28b may be positioned on rotor 12 opposite comb drive 28a.

Inner frame 14 (and thus rotor 12) are moved with respect to outer frame 15 in a manner similar to the relative movement between rotor 12 and inner frame 14 described above. One comb of an actuator 28c is attached to inner frame 14, while a mating comb is attached to outer frame 15. When a voltage is applied across the combs of actuator 28c, a force is developed between the fingers and the combs to move together. Activation of actuator 28c moves inner frame 14 (which carries rotor 12 with it) in the negative direction along the X-axis. A second comb drive 28d may be positioned on inner frame 14 opposite comb drive 28c to move inner frame 14 in the positive direction along the X-axis.

In one embodiment having four actuators 28a, 28b, 28c, 28d as shown in FIG. 1, rotor 12 may thus be moved in any direction by appropriate activation of any one or a combination of actuators 28a, 28b, 28c, 28d.

Out of plane motion and rotation of rotor 12 may be reduced by proper orientation of comb drives 28a, 28b, 28c, 28d. Combs drives 28a, 28b, 28c, 28d are preferably positioned symmetrically about the plane of rotor 12, such that the forces generated by comb drives 28a, 28b, 28c, 28d are in the X-Y plane only. In one embodiment, the fingers of the comb drives do not extend above or below the thickness of rotor 12 (see FIG. 3), so that the forces generated by the comb drive do not extend out of the X-Y plane. In addition, comb drives 28a, 28b, 28c, 28d are preferably oriented along a centerline of rotor 12, so that rotational or twisting forces placed on rotor 12 and inner frame 14 are reduced.

The spacing between adjacent components such as between adjacent flexures, or between rotor 12 and inner frame 14, is dependant upon factors including the required range of motion of the components, the mass of the rotor, etc. In one embodiment of the invention, for example, the rotor is approximately 1.8 mm square, the spacing between adjacent flexures is approximately 25 μm, and the thickness of the flexures is approximately 3 μm. Of course the spacing and thicknesses may be greater or less than the exemplary spacing, depending upon factors such as the desired range of motion, material composition, rotor mass, etc.

Figure 5:
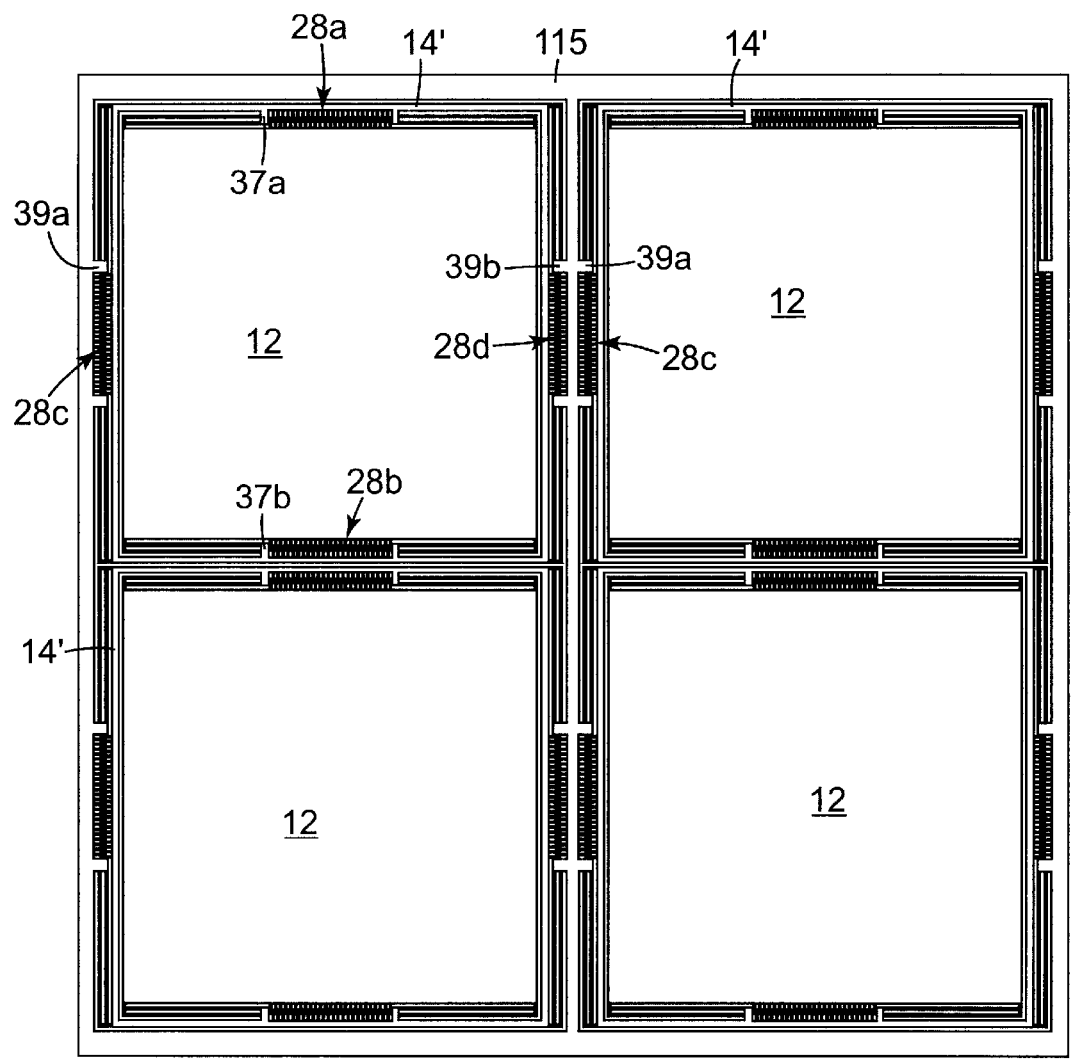
FIG. 5 is a plan view of another embodiment of the invention having a plurality of rotors.

Although the storage module 10 has been described above with respect to a single rotor 12 supported within outer frame 15, in practice a plurality of rotors 12 may be supported by outer frame 15. A storage module 110 having an array of rotors 12 is illustrated in FIG. 5. It will be noted that the orientation of flexures 36a, 36b, 38a, 38b provides a significant benefit when a plurality of rotors 12 are used in the storage module 110. Specifically, flexures 36a, 36b, 38a, 38b are arranged about the periphery of rotors 12 and inner frames 14' such that flexures 36a, 36b, 38a, 38b are substantially in alignment with the respective adjacent edges of rotors 12 and inner frames 14'. Thus, the total area required for each rotor 12 and its associated suspension system is reduced and the packing density of rotors 12 within storage module 110 is correspondingly increased.

The packing density of the rotors 12 in storage module 110 may be further increased, as illustrated in FIG. 5, by eliminating the majority of the outer frame 115 between adjacent inner frames 14'. Specifically, it can be seen in FIG. 5 that the outer frame 115 is reduced to leave only the portion of outer frame 115 which supports outer flexure mounts 39a, 39b of adjacent inner frames 14'. The portion of outer frame 115 which includes outer flexure mounts 39a, 39b is mechanically secured to a fixed base, so that each rotor 12 of the array of rotors 12 may move independently. Of course, frame 115 may also be extended so that it fully surrounds each rotor 12 and inner frame 14', if that is desired for a particular application.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data storage module for a data storage device, the storage module comprising:
   a rotor having a plurality of storage areas for data storage, the storage areas each being in one of a plurality of states to represent the data stored in that area;
   a first frame for supporting the rotor;
   a first set of coupling beams extending from the rotor;
   a first set of flexures extending between the first set of coupling beams and the first frame for suspending the rotor within the first frame and permitting the rotor to move in a first direction;
   a first comb drive connected to the rotor and the first frame for moving the rotor in the first direction;
   a second frame for supporting the first frame;
   a second set of flexures suspending the first frame within the second frame and permitting the first frame to move in a second direction normal to the first direction; and
   a second comb drive connected to the first frame and the second frame for moving the first frame in the second direction.

2. The data storage module of claim 1, wherein the rotor lies in a plane, and wherein the first and second comb drives are positioned symmetrically about the plane of the rotor.

3. The data storage module of claim 1, wherein the first set of flexures have axes that are normal to the first direction.

4. The data storage module of claim 1, wherein the second set of flexures have axes that are normal to the second direction.

5. The data storage module of claim 1, further comprising
   a third comb drive connected to the rotor and the first frame for moving the rotor in a direction opposite to the first comb drive; and
   a fourth comb drive connected to the first frame and the second frame for moving the first frame in a direction opposite to the second comb drive.

6. The data storage module of claim 1, wherein the axis of the first set of flexures intersects the second set of flexures along a length of the second set of flexures.

7. The data storage module of claim 1, wherein the first and sec and sets of flexures are thin-walled micro-fabricated beams.

8. The data storage module of claim 3,
   wherein the first set of coupling beams have axes that are normal to the axes of the first set of flexures.

9. The data storage module of claim 4, further comprising:
   a second set of coupling beams extending from the first frame, the second set of coupling beams have axes that are normal to the axes of the second set of flexures;
   wherein the second set of flexures extend between the second set of coupling beams and the second frame.

10. The data storage module of claim 1, further comprising:
    a plurality of rotors, each being similar to the rotor recited in claim 1, each of the plurality of rotors suspended by a set of flexures within a corresponding one of a plurality of frames, each frame being similar to the first frame recited in claim 1, each of the plurality of frames suspended within the second frame.

11. The data storage module of claim 10, further comprising:
    a plurality of comb drives connecting each of the plurality of rotors with the corresponding frame, and connecting each of the plurality of frames with the second frame.

12. The data storage module of claim 1, wherein the first and second sets of flexures comprise micro-fabricated beams.

13. A storage module for a data storage device, the storage module comprising:
    a rotor having a plurality of storage areas for data storage, the storage areas each being in one of a plurality of states to represent the data stored in that area, the rotor bounded by top, bottom, left and right edges;
    an inner frame for supporting the rotor;
    a first set of flexures supporting the rotor within the inner frame, the first set of flexures having axes aligned with the top and bottom edges of the rotor;
    a set of rotor coupling beams connecting the rotor to the first set of flexures;
    an outer frame for supporting the inner frame;
    a second set of flexures supporting the inner frame within the outer frame, the second set of flexures having axes aligned with the left and right edges of the rotor;
    a set of frame coupling beams connecting the inner frame to the second set of flexures;
    at least one comb drive for moving the rotor with respect to the inner frame; and
    at least one comb drive for moving the inner frame with respect to the outer frame.

14. The storage module of claim 13,
    wherein the rotor coupling beams have axes that are normal to the axes of the first set of flexures,
    and wherein the frame coupling beams have axes that are normal to the axes of the second set of flexures.

15. The storage module of claim 13, wherein the first and second sets of flexures each comprise at least two individual flexures.

16. The storage module of claim 13, wherein the first and second sets of flexures each comprise four individual flexures.

17. The storage module of claim 13, wherein the axes of the first set of flexures intersects the second set of flexures along a length of the second set of flexures.

18. The storage module of claim 14, wherein the rotor and the inner frame are rectangular in shape, and wherein the rotor coupling beams and the frame coupling beams extend from each corner of the rotor and inner frame, respectively.

* * * * *